2,850,913

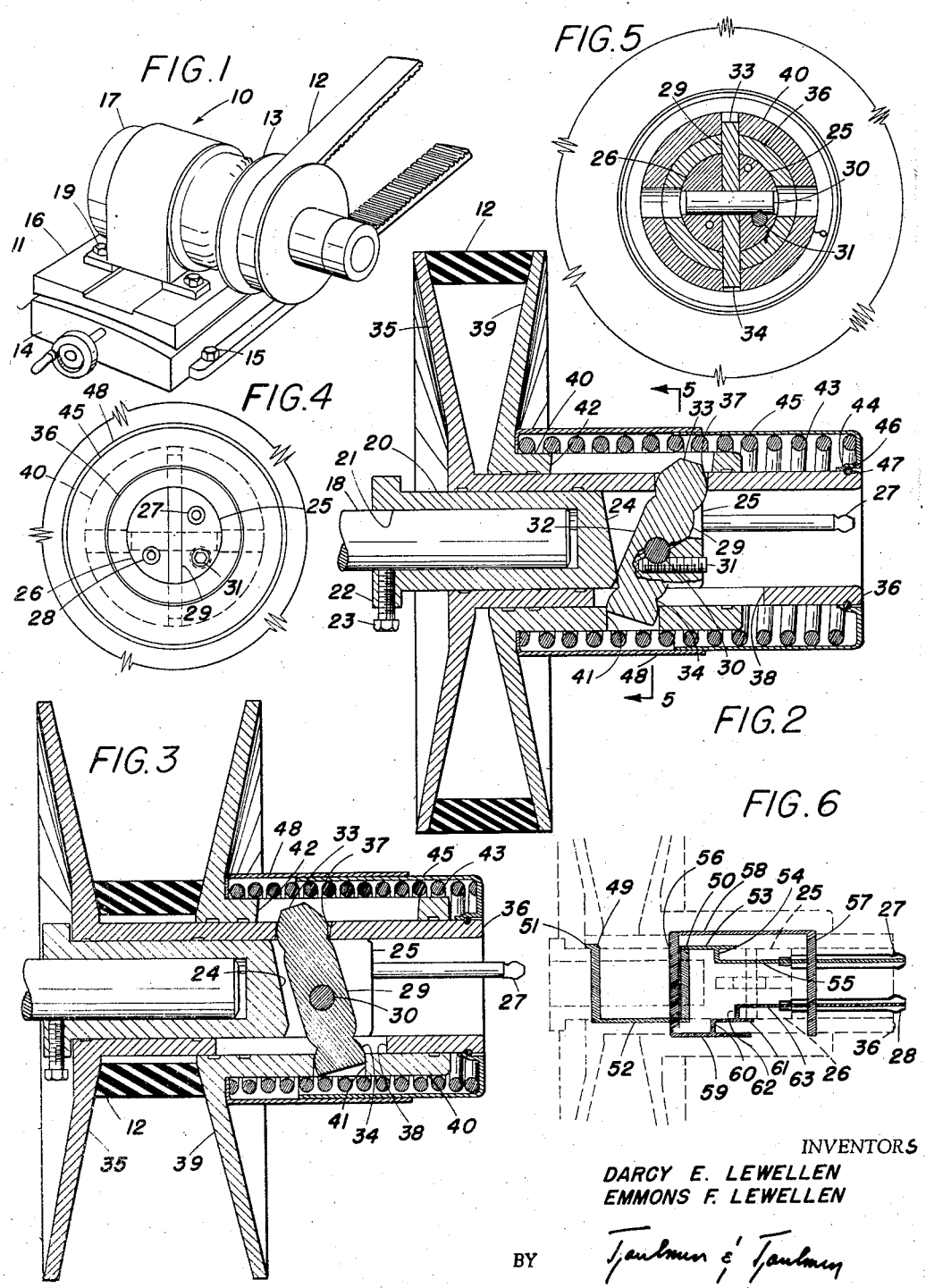

VARIABLE PITCH PULLEY

Darcy E. Lewellen and Emmons F. Lewellen, Columbus, Ind.

Application May 3, 1955, Serial No. 505,574

3 Claims. (Cl. 74—230.17)

This invention relates to a pulley, more particularly, to an infinitely variable pitch sheave especially adapted for power transmission.

In many instances it is desirable to transmit power from a motor or the like by means of a pulley mounted upon the output shaft of the motor and drivingly connected by a belt to a device which is to be powered. It is frequently desirable to vary the speed at which the device operates. This change of speed is usually accomplished by removing the belt, changing the size of the pulleys involved and then replacing the belt. Step pulleys having sheaves of varying pitch thereon have been provided wherein it is only necessary to change the belt to another set of sheaves.

The above described procedure, however, is inefficient and time consuming. The machinery involved must first be shut down. Subsequently, the necessary belt and pulley changes are effected. After these operations the device is ready to begin operation at the different speed. In addition to being time-consuming, this procedure decreases the output of the machine due to the shut-downs necessary to change the machine's speed. Furthermore, space must be provided in order to store additional pulleys and belts suitable for use at various speeds.

The present invention is directed to a variable pitch drive which eliminates the above described disadvantages and introduces several new advantages. This invention discloses a variable pitch sheave which is simple in operation and construction.

Variable pitch sheaves have been previously used in industry. The present invention, however, is directed to an improved variable pitch sheave the advantages of which will become readily apparent from the following description.

The variable pitch sheave of this invention essentially comprises a sleeve upon which are slidably mounted a pair of discs. The hubs of these discs are drivingly connected to the sleeve by means of a pivoted link. This connection enables both discs to move simultaneously in opposite directions. A spring is provided to urge the discs together.

There is incorporated in the variable pitch sheave of this invention an improved lubrication system which insures that the moving components of the sheave are adequately lubricated at all times.

The variable sheave of this invention is especially adapted for use with a variable pulley drive, which comprises a variable pulley, a variable belt and an adjustable base. An electric motor is mounted upon the adjustable base. The variable sheave is affixed to the output shaft of the motor and is drivingly connected to a machine by means of a variable belt. Adjustment of the base varies the center distance between the motor and a machine shaft. This adjustment accordingly varies the speed of the machine shaft. It can be readily appreciated that with the variable pulley drive as described, the machine shaft speed may be adjusted without ceasing operation of the machine. The positioning of the motor by means of an adjustable base will result in the variable sheave automatically adjusting itself to relocate the position of the guiding belt thereon. This structure will result in a direct drive for connecting a motor and a machine smoothly and flexibly over a range of infinitely variable speeds.

It is therefore the principal object of this invention to provide an improved variable pitch sheave.

It is another object of this invention to provide a drive structure to smoothly connect a machine over a range of variable speeds.

It is a further object of this invention to provide a variable pitch sheave wherein the belt tracks in a fixed path for all diameters.

It is still another object of this invention to provide a variable pitch sheave which occupies less space and has a reduced overhung load.

It is a still further object of this invention to provide a variable pitch sheave having an improved lubricating system, with readily accessible lubricating fittings on the end of the hub.

It is still an additional object of this invention to provide a variable pitch sheave having an improved driving connection between the discs thereof.

Other objects and advantages of this invention will become readily apparent upon reference to the following description when taken in conjunction with the accompanying drawings, wherein;

Figure 1 is an over-all perspective view of the variable pulley drive disclosed in this invention;

Figure 2 is a longitudinal sectional view of the variable pitch sheave disclosed in this invention;

Figure 3 is a sectional view similar to that of Figure 2 and showing the discs in a modified position;

Figure 4 is an end elevational view of the variable pitch sheave;

Figure 5 is a sectional view taken along the lines 5—5 of Figure 2;

Figure 6 is a diagrammatic view showing the lubricating system of the variable pitch sheave.

Returning now to the drawings, more particularly to Figure 1 wherein like reference symbols indicate the same parts throughout various views, 10 indicates a variable pulley drive incorporating the variable pitch sheave disclosed as this invention. The variable pulley drive 10 comprises an adjustable base 11, a variable belt 12 and a variable sheave 13.

The adjustable base comprises a stationary portion 14, which is secured to a support by means of bolts 15. Slidably mounted upon the base portion 14 is a movable base portion 16. A conventional electric motor 17 having an output shaft 18 is secured to the movable base portion by means of bolts 19.

The variable belt 12 is of the endless V type and is preferably made of molded synthetic rubber. This material is oil resisting, heat resisting and static conducting. The construction of the belt preferably includes a core tension section and transverse ribs for flexibility and lateral rigidity.

Proceeding now to Figure 2 there is illustrated in detail the variable pitch sheave 13. The sheave 13 comprises a cylindrical sleeve 20 which has an axial bore 21 in one end thereof. An external flange 22 surrounds the opening of the axial bore 21. A set screw 23 is provided to secure the sleeve to the output shaft of the motor which is inserted into the axial bore 21.

There is a diametrical slot 24 in the other end of the sleeve 20. This slot results in a bifurcated end having furcations 25 and 26. Grease fittings 27 and 28 extend axially from the furcations 25 and 26 respectively.

A link 29 is pivoted in the slot 24 by means of a pin 30. The pin 30 is located off-center with respect to the longitudinal axis of said sleeve. A set screw 31 is employed to retain the pivot pin 30 in position.

The link 29 is made of flat metallic stock and has a flat central portion 32 through which the pivot pin 30 extends. The ends of the link 29, as indicated at 33 and 34, are contoured as shown in Figures 2 and 3, for a purpose to be described later.

Slidably mounted upon the sleeve 20 is an inner disc 35 having a hub 36 integral therewith. There is a longitudinally extending slot 37 in the inner disc hub 36. The end 33 of the link 29 is closely received within the slot 37. The contoured edges of the link end 33 enable the end of the link to rotate within the slot 37.

In the inner disc hub 36 diametrically opposed from the slot 37 is a second longitudinally extending slot 38. The slot 38 is considerably longer than the slot 37.

Slidably mounted upon the inner disc hub 36 is an outer disc 39 having a hub 40. There is a slot 41 in the outer disc hub 40 which slot closely receives the link end 34. The link end 34 is also contoured in order to rotate within the slot 41 as the position of the outer disc hub varies.

There is a second longitudinally extending slot 42 in the outer disc hub 40 which slot 42 is diametrically opposed from the slot 41. The slot 42 is also considerably longer in length than the slot 41.

It is pointed out that the shorter slot of one disc hub is aligned with the longer slot of the other disc hub. Consequently, the link end 33 may project into the slot 42 to drivingly engage the outer disc hub. The link end 34 passes through the slot 38 in the inner disc hub to be closely received in the slot 41 of the outer disc hub. Each end of the link drivingly connects each disc hub. The pin 30 or pivot point of the link is substantially midway of the points where each end of the link engages the disc hubs. This results in the disc hubs moving equal distances in opposite directions at all times. There are aligned radial openings in both disc hubs 36 and 40 to permit assembly and removal of the pivot pin 30.

There is a helical compression spring 43 surrounding the outer disc hub 40. One end of the spring, as indicated at 44, engages the end of an inner spring cover 45 which is retained in position by a spring wire 46 inserted in an annular groove 47 located adjacent the end of the inner disc hub 36.

The other end of the spring engages the end of an outer spring cover 48. The diameter of the outer spring cover 48 is slightly larger than the diameter of the inner spring cover 45 to enable the spring covers to move in telescoping relationship with each other. The spring is the resilient thrusting means for positioning the discs, but the driving link 29 is entirely independent of this thrusting means and is a non-thrusting means for symmetrically moving the discs equal distances.

The improved lubricating system disclosed in this invention is diagrammatically illustrated in Figure 6. The inner disc hub 36 is lubricated through the fitting 27 by means of a network of annular and longitudinal grooves. There are a pair of annular grooves 49 and 50 in the inner surface of the inner disc hub 36. A longitudinal groove 51 communicates between the groove 49 and the outer face of the inner disc 35. There is a second longitudinally extending groove 52 which interconnects the annular grooves 49 and 50. A longitudinal groove 53 extends from the annular groove 50 along the inner surface of the inner disc hub toward the fitting 27. A transverse passage 54 communicates with the longitudinal groove 53 and a longitudinal passage 55 extends from the fitting 27.

The outer disc hub 40 is lubricated through the fitting 28 by a separate network of annular and longitudinal grooves. The lubrication system of the outer disc hub comprises a pair of annular grooves 56 and 57. These grooves are interconnected by means of a longitudinally extending groove 58 in the inner face of the outer disc hub.

There is another longitudinally extending groove 59 in the inner face of the outer disc hub which extends from the annular groove 56 toward the annular groove 57. A transverse passage 60 through the inner disc hub 36 intercommunicates the longitudinal groove 59 with a longitudinal groove 61 in the inner face of the inner disc hub. The longitudinal groove 61 is connected by a radial passage 62 in the sleeve 20 with a passage 63 which extends from the lubricating fitting 28.

As will be apparent upon examination of the views of Figures 4 and 5, both discs are free for axial movement. However, the link 29 prevents any relative rotative movement of the discs and the sleeve. Consequently, the lubricating system as previously described will provide uninterrupted communication from the respective fitting to the bearing surfaces of the respective disc. Consequently, the longitudinally extending grooves 53, 59 and 61 are made of sufficient length so as to communicate with the respective radial passages for all positions of the discs upon the sleeves. The result is a lubrication system which continuously functions to insure adequate lubrication of the sliding surfaces of the variable pitch sheave.

Returning to Figure 2, it is pointed out that the discs are illustrated as supporting the belt 12 near the peripheries thereof. In Figure 3 the discs are shown spaced apart with the belt 12 being retained in a position proximate the centers of the discs. In each position of the sheave the track of the belt 12 remains fixed. This is due to the sheave's structure which enables both discs to move simultaneously and equal distances in opposite directions. A further consequence of the interconnecting relationship of the discs is a spring which engages both discs and independently thrusts both discs directly and equally into driving engagement with the belt in all positions of the sheave. The thrust by the spring upon both discs is against the belt at all times.

Thus it can be seen that an improved variable pitch sheave is provided. By employing a single pivoted link with contoured end to connect the sliding discs the number of parts for the sheave is considerably reduced. In addition, since the link is small in relation to the remainder of the sheave structure, a more compact and lighter weight sheave results. In addition, the simplicity of the structure materially reduces the problem of dynamic balancing of the sheave.

Maintenance problems regarding the variable pitch sheave are materially reduced by providing a lubrication system wherein each grease fitting lubricates a definite portion of the internal mechanism of the sheave.

The variable pitch sheave may be used with a belt to drive either a pulley or a sheave. The pulleys may be of flat or crown face type. The shafts may be horizontal or vertical and rotate in either direction.

It will be understood that this invention is susceptible to modification in order to adapt it to different usages and conditions, and, accordingly it is desired to comprehend such modification within this invention as may fall within the scope of the appended claims.

What is claimed is:

1. A variable sheave comprising a sleeve, said sleeve having a slot in one end thereof to form a bifurcated end, a link pivotably mounted in said slot and having the ends thereof projecting outwardly of said sleeve, an inner disc hub slidably mounted on said sleeve, said inner disc hub having a longitudinally extending slot to receive one end of said link and a second diametrically opposed longitudinally extending slot considerably longer than said first slot, an outer disc having a hub slidably mounted on the inner disc hub, said outer disc hub having a longitudinally extending slot to receive the other end of said link and a second diametrically opposed longitudinally extending slot considerably longer than said first slot, the shorter slot of one hub being aligned with the longer slot of the other hub, spring means surrounding said outer disc hub, means on the outer end of said inner disc hub to retain one end of said spring, the other end of said spring engaging the face of said outer disc whereby said discs are thrust toward each other and said link symmetrically positions said discs, a plurality of annular grooves in the inner surface of said inner disc hub, a first lubricating fitting in one of said furcations, passage means intercommunicating said grooves with said first fitting irrespective of the axial position of said inner disc hub, a plurality of annular grooves on the inner surface of said outer disc hub, a second lubricating fitting in the other of said furcations, and passage means interconnecting said annular grooves in said outer disc hub with said second fitting irrespective of the axial position of said outer disc hub.

2. A variable sheave comprising a sleeve, said sleeve having a slot in one end thereof to form a bifurcated end, a link pivotably mounted in said slot and having the ends thereof projecting outwardly of said sleeve, an inner disc hub slidably mounted on said sleeve, said inner disc hub having a longitudinally extending slot to receive one end of said link and a second diametrically opposed longitudinally extending slot considerably longer than said first slot, an outer disc having a hub slidably mounted on the inner disc hub, said outer disc hub having a longitudinally extending slot to receive the other end of said link and a second diametrically opposed longitudinally extending slot considerably longer than said first slot, the shorter slot of one hub being aligned with the longer slot of the other hub, spring means surrounding said outer disc hub, means on the outer end of said inner disc hub to retain one end of said spring, the other end of said spring engaging the face of said outer disc whereby said discs are thrust toward each other and said links symmetrically positions said discs, a first lubricating fitting in one of said furcations and a second lubricating fitting in the other furcation, spaced annular grooves on the inner surface of said inner disc hub, a first longitudinally extending groove on the inner surface of said inner disc hub and interconnecting said spaced annular grooves, a second longitudinally extending groove from the annular groove nearest to the bifurcated end and extending toward said end, a first transverse passage in said sleeve communicating with the said second longitudinally extending groove, a longitudinally extending passage in said sleeve communicating with said first transverse passage and connected to one of said lubricating fittings, spaced annular grooves on the inner surface of said outer disc hub, a third longitudinally extending groove on the inner surface of said outer disc hub interconnecting the spaced annular grooves thereon, a fourth longitudinally extending groove on the inner surface of said outer disc hub and extending from the annular groove fartherest from said bifurcated end in a direction toward said end, a second transverse passage in said inner disc hub communicating with said third longitudinal groove, a fifth longitudinally extending groove on the inner surface of said inner disc hub extending from said second transverse groove toward said bifurcated end, a third transverse passage in said sleeve communicating with said fifth longitudinal groove, and a longitudinally extending passage in said sleeve communicating with said third transverse passage and connected to the other of said lubricating fittings.

3. A variable sheave as claimed in claim 2 with said second, fourth and fifth longitudinally extending grooves extending beyond their respective transverse passages towards said bifurcated end of the sleeve a distance substantially equal to the axial movement of said disc hubs so that said longitudinally extending grooves communicate with the respective transverse passages for all positions of the discs upon the sleeve to lubricate the sliding surfaces of the variable pitch sheave during various axial positions of the disc hubs.

References Cited in the file of this patent

UNITED STATES PATENTS

| | | |
|---|---|---|
| 1,648,174 | Williams | Nov. 8, 1927 |
| 2,185,411 | Lewellen | Jan. 2, 1940 |
| 2,611,277 | Mitchell | Sept. 23, 1952 |

FOREIGN PATENTS

| | | |
|---|---|---|
| 70,758 | Denmark | Mar. 20, 1950 |
| 1,083,818 | France | June 30, 1954 |

(Corresponding U. S. Patent 2,751,790, June 26, 1956.)